(12) United States Patent
Tschirhart

(10) Patent No.: US 7,969,287 B2
(45) Date of Patent: Jun. 28, 2011

(54) HAPTIC EFFECT CONTROL SYSTEM

(75) Inventor: Michael Dean Tschirhart, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 340 days.

(21) Appl. No.: 12/193,060

(22) Filed: Aug. 18, 2008

(65) Prior Publication Data

US 2010/0039244 A1 Feb. 18, 2010

(51) Int. Cl.
*G08B 3/10* (2006.01)
*G08B 6/00* (2006.01)
*H04B 3/36* (2006.01)
*G09G 5/00* (2006.01)
*G06F 19/00* (2011.01)

(52) U.S. Cl. ............... 340/384.7; 340/384.1; 340/407.1; 340/407.2; 340/425.5; 345/156; 345/161; 345/184; 463/30; 463/35

(58) Field of Classification Search .................. None
See application file for complete search history.

(56) References Cited

U.S. PATENT DOCUMENTS

| | | |
|---|---|---|
| 4,561,049 A | 12/1985 | Deleganes et al. |
| 5,212,473 A | 5/1993 | Louis |
| 5,782,639 A | 7/1998 | Beal |
| 6,198,206 B1 | 3/2001 | Saarmaa et al. |
| 6,422,941 B1 | 7/2002 | Thorner et al. |
| 6,636,197 B1 | 10/2003 | Goldenberg et al. |
| 6,822,635 B2 * | 11/2004 | Shahoian et al. ............. 345/156 |
| 7,015,407 B2 | 3/2006 | Hein |
| 7,180,017 B2 | 2/2007 | Hein |
| 7,623,114 B2 * | 11/2009 | Rank ............................. 345/156 |
| 2005/0017947 A1* | 1/2005 | Shahoian et al. ............. 345/156 |
| 2005/0261815 A1* | 11/2005 | Cowelchuk et al. ............ 701/36 |
| 2006/0061553 A1* | 3/2006 | Korhonen ..................... 345/168 |
| 2006/0284839 A1* | 12/2006 | Breed et al. .................. 345/156 |
| 2008/0062143 A1* | 3/2008 | Shahoian et al. ............. 345/173 |
| 2008/0088602 A1 | 4/2008 | Hotelling |
| 2009/0015549 A1* | 1/2009 | Gelfond et al. ............... 345/156 |
| 2009/0167508 A1* | 7/2009 | Fadell et al. ................ 340/407.2 |
| 2009/0244017 A1* | 10/2009 | Pala et al. ..................... 345/173 |

* cited by examiner

*Primary Examiner* — Julie Lieu
(74) *Attorney, Agent, or Firm* — Fraser Clemens Martin & Miller LLC; J. Douglas Miller

(57) ABSTRACT

A haptic effect control system includes: a user interface adapted to receive a user-provided input and transmit a control signal representing the user-provided input; a controller in communication with the user interface and adapted to receive the control signal, analyze the control signal, and generate and transmit a first haptic-audio signal in response to the analysis of the control signal, wherein the first haptic-audio signal represents a first audio output for creating a desired sound pressure deviation from the ambient pressure of the user's environment; and an audio system including a device capable of producing the first audio output having a desired sound pressure level, wherein the audio system is adapted to receive the first haptic-audio signal and transmit the first audio output in response to the first haptic-audio signal.

20 Claims, 1 Drawing Sheet

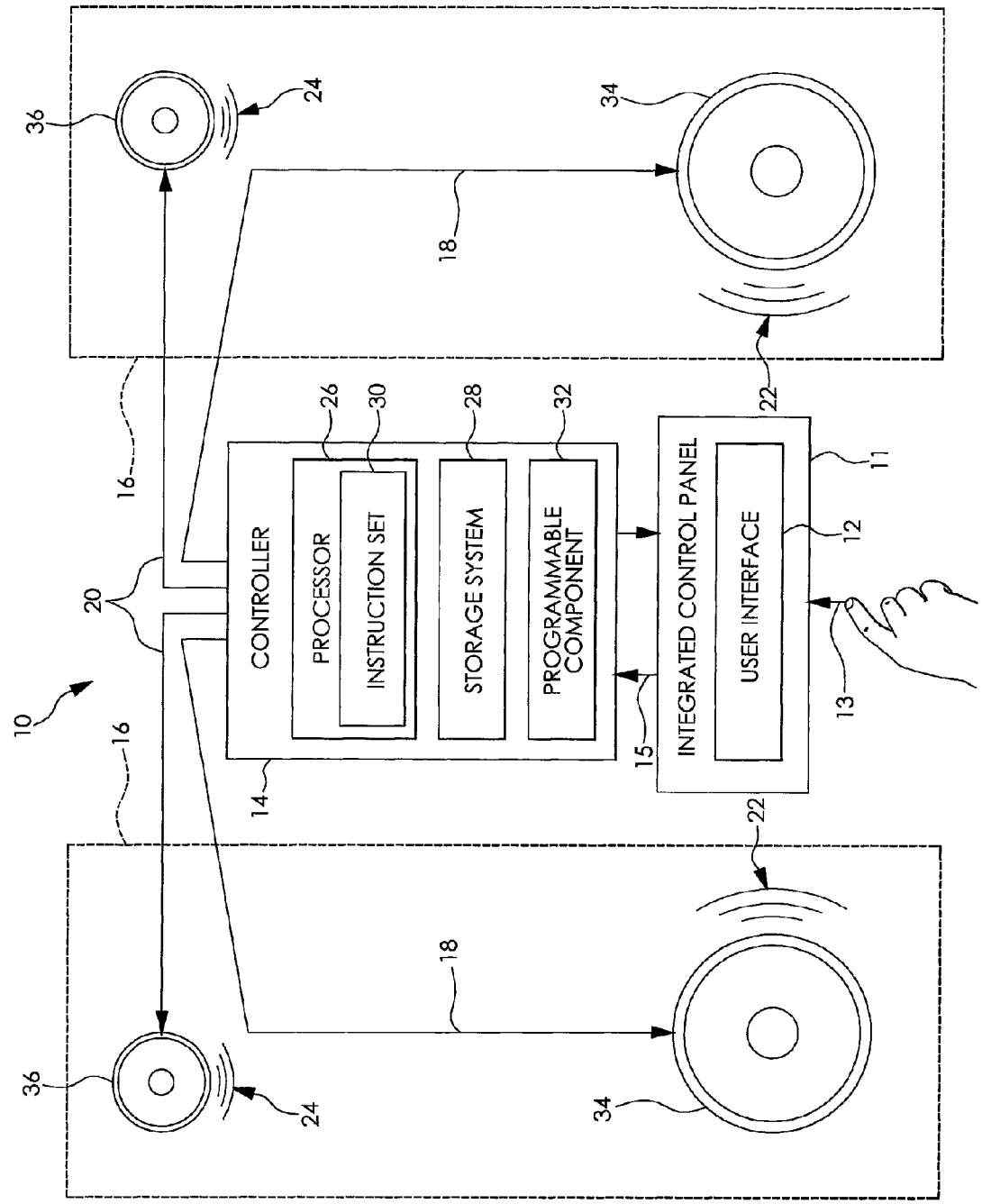

HAPTIC EFFECT CONTROL SYSTEM

FIELD OF THE INVENTION

The present invention relates to human machine interface (HMI). More particularly, the invention is directed to a haptic effect control system for a vehicle and a method for generating a haptic sensation user feedback without mechanical control surface actuation

BACKGROUND OF THE INVENTION

Many modern electronic control types (rotary, switch, etc.) and technologies (touch screens, solid state switches, etc.) transmit tactile feedback to the user. Electro-mechanical haptic technologies are commonly employed to provide the desired tactile feedback, but add substantial complexity and cost through incremental requirements. Typically, haptic-tactile systems include expensive and complex physical actuation devices that re-introduce an incremental tactile element to the user experience with electronic controls.

It would be desirable to have a cost effective haptic effect control system and method for providing a haptic sensation feedback to a user without mechanical control surface actuation.

SUMMARY OF THE INVENTION

Concordant and consistent with the present invention, a cost effective haptic effect control system and method for providing a haptic sensation feedback to a user without mechanical control surface actuation, has been discovered.

In one embodiment, a haptic effect control system comprises: a user interface adapted to receive a user-provided input and transmit a control signal representing the user-provided input; a controller in communication with the user interface and adapted to receive the control signal, analyze the control signal, and generate and transmit a first haptic-audio signal in response to the analysis of the control signal, wherein the first haptic-audio signal represents a first audio output for creating a desired sound pressure deviation from the ambient pressure of the user's environment; and an audio system including a device capable of producing the first audio output having a desired sound pressure level, wherein the audio system is adapted to receive the first haptic-audio signal and transmit the first audio output in response to the first haptic-audio signal.

In another embodiment, a haptic effect control system comprises: a user interface adapted to receive a user-provided input and transmit a control signal representing the user-provided input; a controller in communication with the user interface and adapted to receive the control signal, analyze the control signal, and generate and transmit a first haptic-audio signal in response to the analysis of the control signal, wherein the first haptic-audio signal represents a first audio output having a desired frequency for creating a sound pressure deviation from the ambient pressure of the user's environment; an audio system including a device capable of producing the first audio output having a desired frequency and sound pressure level, wherein the audio system is adapted to receive the first haptic-audio signal and transmit the first audio output in response to the first haptic-audio signal; and a programmable component adapted to provide user-controlled management of at least one of the haptic-audio controller and the audio system.

The invention also provides methods for providing a haptic sensation feedback to a user.

One method comprises the steps of: receiving a user-provided input; generating a control signal, wherein the control signal represents the user-provided input; analyzing the control signal; and generating a first audio output in response to the analysis of the control signal, wherein the first audio output creates a desired sound pressure deviation from the ambient pressure of the user's environment, thereby providing a perceived haptic sensation in the user.

BRIEF DESCRIPTION OF THE DRAWINGS

The above, as well as other advantages of the present invention, will become readily apparent to those skilled in the art from the following detailed description of the preferred embodiment when considered in the light of the accompanying drawing which is a schematic block diagram of a haptic effect control system according to an embodiment of the present invention.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Referring to the FIGURE, there is illustrated a haptic effect control system 10 according to the present invention. The haptic effect control system 10 includes a user interface 12, a controller 14, and an audio system 16. It is understood that other components may be included in the haptic effect control system 10, as desired.

The user interface 12 may be any device or system adapted to receive a user-provided input 13 and thereby initiate a feedback to the user. As a non-limiting example, the user interface 12 may be a touch sensitive screen or a solid state switch. It is understood that other interface devices may be used, as desired. It is further understood that the user-provided input 13 may initiate other functions integral to the user interface 12 or other systems and devices in communication with the user interface 12. In certain embodiments the user interface 12 is a component of an integrated control panel 11 of a vehicle. As shown, the user interface 12 is interconnected with the controller 14. Specifically, the user interface 12 is adapted to transmit a control signal 15 to the controller 14, wherein the control signal 15 represents the user provided input 13. It is understood that other data, information and signals may be transmitted between the user interface 12 and the controller 14, as desired.

The controller 14 is in communication with the user interface 12 and the audio system 16. The controller 14 is adapted to receive the control signal 15, analyze the control signal 15, and generate and transmit a plurality of haptic-audio signals 18, 20 in response to the analysis of the control signal 15. The controller 14 may be any device adapted to receive the control signal 15, analyze the control signal 15, and generate and transmit the haptic-audio signals 18, 20 such as a microcomputer, for example. Other devices may be used, as appropriate. It is understood that the analysis of the control signal 15 by the controller 14 may be pre-determined. It is further understood that the analysis of the control signal 15 may by modified, as desired. The controller 14 transmits the haptic-audio signals 18, 20 to the audio system 16 for controlling a plurality of audio outputs 22, 24 of the audio system 16. Specifically, each of the haptic-audio signals 18, 20 represents a set of desired output characteristic of the audio system 16 such as frequency, amplitude and sound pressure, for example. It is understood that the haptic-audio signals 18, 20 may represent other characteristics of the audio outputs 22, 24, as desired. It is further understood that any number of haptic-audio signals 18, 20 may be generated by the controller 14, as desired. As a non-limiting example, a first haptic-audio signal 18 represents characteristics of a first audio output 22 having a low frequency for creating a desired sound pressure deviation from the ambient pressure of the user's environment, while a second haptic-audio signal 20 represents characteristics of a second audio output 24 having an audible high frequency. It is understood that the generation and transmission first haptic-audio signal 18 and the second haptic-audio signal 20 may be sequenced in any manner, as desired.

In certain embodiments, the controller 14 is integrated with the audio system 16 and adapted to control the audio outputs 22, 24 of the audio system 16. In other embodiments, the controller 14 is a separate device adapted to transmit the haptic-audio signals 18, 20 to the separate audio system 16. It is understood that the controller 14 may be integrated with any device or system, as desired. It is further understood that the controller 14 may be installed as a supplemental component to a vehicle system (not shown).

In certain embodiments, the controller 14 includes a processor 26 and a storage system 28. The processor 26 is adapted to analyze the control signal 15 based upon an instruction set 30. The instruction set 30, which may be embodied within any computer readable medium, includes processor executable instructions for configuring the processor 26 to perform a variety of tasks. The storage system 28 may be a single storage device or may be multiple storage devices. Portions of the storage system 28 may also be located on the processor 26. Furthermore, the storage system 28 may be a solid state storage system, a magnetic storage system, an optical storage system or any other suitable storage system. It is understood that the storage system 28 is adapted to store the instruction set 30. Other data and information may be stored in the storage system 28, as desired.

The controller 14 may further include a programmable component 32. The programmable component 32 is in communication with the processor 26. It is understood that the programmable component 32 may be in communication with any other component of the haptic effect system 10 such as the audio system 16 and the storage system 28, for example. In certain embodiments, the programmable component 32 is adapted to manage and control processing functions of the processor 26. Specifically, the programmable component 32 is adapted to control the analysis of the control signal 15 and the generation and transmission of the haptic-audio signals 18, 20. The programmable component 32 provides a means for a user to actively manage the operation of the processor 26 and thereby control the resultant audio outputs 22, 24 generated by the audio system 16. It is understood that the programmable component 32 may be adapted to manage and control the audio system 16. It is further understood that the programmable component 32 may be adapted to store data and information on the storage system 28 and retrieve data and information from the storage system 28. Where the controller 14 includes a programmable component 32, the analysis of the control signal 15 by the controller 14 may be pre-programmed. It is understood that the analysis of the control signal 15 and the generation and transmission of the haptic-audio signals 18, 20 may be adjusted in real-time or pre-programmed by the original equipment manufacturer (OEM) or user. It is further understood that the functions of the controller 14 may have stored settings that may be recalled and processed, as desired.

The audio system 16 is adapted to receive the haptic-audio signals 18, 20 and transmit the audio outputs 22, 24 in response to the haptic-audio signals 18, 20. The audio system 16 may include any device or plurality of devices for receiving the haptic-audio signals 18, 20 and transmitting the associated audio outputs 22, 24 such as speakers, for example. Other devices may be used, as appropriate. As shown, the audio system 16 includes a plurality of first speakers 34 and a plurality of second speakers 36. It is understood that any number of first speakers 34 and second speakers 36 may be included as desired. As a non-limiting example, the audio system 16 may include additional components such as speakers, amplifiers, tuners, regulators, cross-overs, and filters.

In certain embodiments, the first speakers 34 are adapted to receive the first haptic-audio signal 18 and transmit the first audio output 22 based on the first haptic-audio signal 18, while the second speakers 36 are adapted to receive the second haptic-audio signal 20 and transmit the second audio output 24 based on the second haptic-audio signal 20. As such, the first speakers 34 transmit the first audio output 22 having a low frequency to create a desired sound pressure deviation from the ambient pressure of the user's environment. As a non-limiting example, the low frequency first audio output 22 may have a frequency below 40 hertz. However, other frequencies may be transmitted, as desired. The second speakers 36 transmit the second audio output 24 in the form of an audible signal such as a "beeping" or "clicking" sound within the normal human range of hearing. As a non-limiting example, the high frequency second audio output 24 may have a frequency above 40 hertz. However, it is understood that the audio system 16 may be adapted to transmit the audio outputs 22, 24 within any frequency range, as desired. It is further understood that transmission of the first audio output 22 and the second audio output 24 may be sequenced in any manner, as desired.

In use, a user engages the user interface 12 to actuate a control feature, thereby initiating the transmission of the first audio output 22 and the second audio output 24 by the audio system 16. In certain embodiments, the transmission of the audio outputs 22, 24 is initiated by a direct contact with the user interface 12. However, it is understood that any user-provided input 13 may be used, as desired. Specifically, the user interface 12 transmits the control signal 15 representing the user-provided input 13. The control signal 15 is received by the controller 14, wherein the controller 14 analyzes the control signal 15 and generates and transmits the haptic-audio signals 18, 20 in response to the analysis of the control signal 15. The haptic-audio signals 18, 20 are subsequently received by the audio system 16, wherein the audio system transmits the audio outputs 22, 24 based upon the received haptic-audio signals 18, 20. It is understood that the transmission of the control signal 15, the haptic-audio signals 18, 20, and the audio outputs 22, 24 may be delayed from the time the user-provided input 13 is received by the user interface 12. It is further understood that the sequence and transmission of the haptic-audio signals 18, 20 and the audio outputs 22, 24 may be modified, as desired.

Where at least one of the haptic audio signals 18, 20 represents the high frequency second audio output 24, the audio system 16 transmits the high frequency second audio output 24 in the form of an audible signal such as a "beeping" or "clicking" sound within the normal human range of hearing. Where at least one of the haptic audio signals 18, 20 represents the low frequency first audio output 22, the audio system 16 transmits the low frequency first audio output 22 creating a desired sound pressure deviation from the ambient pressure of the user's environment. Based on principles known to those skilled in the art of acoustics and psycho-acoustics, the sound pressure deviation may be interpreted by the user's brain to contain haptic information and physical vibration elements. Location of the sound pressure source cannot readily be detected by individuals due to characteristics of human hearing that relate to processing low frequency audio signals. Further, the invention relies on overlapping sensory boundaries between whether a signal is "heard" or "felt." Accordingly, a haptic effect sensation is created by the acoustically perceived sound pressure level rather than contact or direct physical vibration produced by a sensory feedback component. As such, the user receives the perceived sensation of a haptic feedback in response to engaging the user interface 12.

The haptic effect control system 10 provides a haptic sensation feedback to the user through the sound pressure deviation created by the low frequency first audio output 22, thereby producing a perceived haptic sensation without mechanical control surface actuation.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A haptic effect control system comprising:
   a user interface to receive a user-provided input and transmit a control signal representing the user-provided input;
   a controller in communication with the user interface and to receive the control signal, analyze the control signal, and generate and transmit a first haptic-audio signal in response to the analysis of the control signal, wherein the first haptic-audio signal represents a first audio output for creating a desired sound pressure deviation from an ambient pressure of an environment of the user; and
   an audio system including a device capable of producing the first audio output having a desired sound pressure level, wherein the audio system is adapted to receive the first haptic-audio signal and transmit the first audio output in response to the first haptic-audio signal, the sound pressure level of the first audio output providing a perceived haptic sensation in the user.

2. The haptic effect control system according to claim 1, wherein the user interface is a component of an integrated control panel for a vehicle.

3. The haptic effect control system according to claim 1, wherein the user interface is one of a touch sensitive screen, a solid-state button, and a solid-state switch.

4. The haptic effect control system according to claim 1, wherein the audio system includes a speaker capable of producing at least the first audio output having a desired sound pressure level.

5. The haptic effect control system according to claim 1, wherein the controller includes a processor to analyze the control signal.

6. The haptic effect control system according to claim 1, wherein the controller includes a storage system for storing data and information.

7. The haptic effect control system according to claim 1, wherein the controller includes a programmable component to provide user-controlled management of the haptic effect control system.

8. The haptic effect control system according to claim 1, wherein the controller generates and transmits a second haptic-audio signal representing a second audio output in the form of an audible signal and the audio system receives the second haptic-audio signal and transmits the second audio output in response to the second haptic-audio signal.

9. A haptic effect control system comprising:
   a user interface to receive a user-provided input and transmit a control signal representing the user-provided input;
   a controller to receive the control signal, analyze the control signal, and generate and transmit a first haptic-audio signal in response to the analysis of the control signal, wherein the first haptic-audio signal represents a first audio output having a frequency and a sound pressure level for creating a sound pressure deviation from an ambient pressure of an environment of the user;
   an audio system including a device capable of producing the first audio output, wherein the audio system receives the first haptic-audio signal and transmits the first audio output in response to the first haptic-audio signal, the frequency and the sound pressure level of the first audio output providing a perceived haptic sensation in the user without mechanical control surface actuation; and
   a programmable component to provide user-controlled management of at least one of the controller and the audio system.

10. The haptic effect control system according to claim 9, wherein the user interface is a component of an integrated control panel for a vehicle.

11. The haptic effect control system according to claim 9, wherein the user interface is one of a touch sensitive screen, a solid-state button, and a solid-state switch.

12. The haptic effect control system according to claim 9, wherein the audio system includes a speaker capable of producing the first audio output having a desired sound pressure level.

13. The haptic effect control system according to claim 9, wherein the controller includes a processor to analyze the control signal.

14. The haptic effect control system according to claim 9, wherein the controller includes a storage system for storing data and information.

15. The haptic effect control system according to claim 9, wherein the controller generates and transmits a second haptic-audio signal representing a second audio output in the form of an audible signal and the audio system receives the second haptic-audio signal and transmits the second audio output in response to the second haptic-audio signal.

16. A method for providing a haptic sensation feedback to a user, the method comprising the steps of:
   receiving a user-provided input;
   generating a control signal, wherein the control signal represents the user-provided input;
   analyzing the control signal; and
   generating a first audio output in response to the analysis of the control signal, wherein the first audio output creates a desired sound pressure deviation from an ambient pressure of an environment of the user, thereby providing a perceived haptic sensation in the user.

17. The method according to claim 16, wherein the step of receiving a user-provided input is performed by a user interface integrated with a vehicle control panel.

18. The method according to claim 16, wherein the step of analyzing the control signal is performed by a controller to receive the control signal.

19. The method according to claim 18, wherein the controller includes a programmable component to provide user-controlled management of at least one of the analysis of the control signal and the generation of the first audio output.

20. The method according to claim 16, further comprising the step of generating a second audio output in response to the analysis of the control signal, wherein the second audio output is an audible sound within a normal human range of hearing.

* * * * *